US012281240B2

(12) United States Patent
Ikeuchi et al.

(10) Patent No.: US 12,281,240 B2
(45) Date of Patent: Apr. 22, 2025

(54) SYNTHETIC RESIN COMPOSITION, FIRE-PROOF MATERIAL, SEALING MATERIAL, ADHESIVE, AND JOINT STRUCTURE

(71) Applicant: Sekisui Fuller Company, Ltd., Tokyo (JP)

(72) Inventors: Takuto Ikeuchi, Shiga (JP); Yukihiko Murayama, Shiga (JP)

(73) Assignee: SEKISUI FULLER COMPANY, LTD., Tokyo (JP)

( * ) Notice: Subject to any disclaimer, the term of this patent is extended or adjusted under 35 U.S.C. 154(b) by 985 days.

(21) Appl. No.: 17/053,494

(22) PCT Filed: May 8, 2019

(86) PCT No.: PCT/JP2019/018460
§ 371 (c)(1),
(2) Date: Nov. 6, 2020

(87) PCT Pub. No.: WO2019/216358
PCT Pub. Date: Nov. 14, 2019

(65) Prior Publication Data
US 2021/0130659 A1    May 6, 2021

(30) Foreign Application Priority Data

May 8, 2018   (JP) ................................. 2018-089675
May 8, 2018   (JP) ................................. 2018-089677

(51) Int. Cl.
| C08K 3/26 | (2006.01) |
| C08K 3/34 | (2006.01) |
| C08K 3/38 | (2006.01) |
| C08K 3/40 | (2006.01) |
| C09J 11/04 | (2006.01) |
| C09J 123/02 | (2006.01) |
| C09J 131/04 | (2006.01) |
| C09J 163/00 | (2006.01) |
| C09J 171/02 | (2006.01) |
| C09J 175/04 | (2006.01) |
| C09J 183/06 | (2006.01) |
| C09K 21/02 | (2006.01) |
| E04B 1/94 | (2006.01) |

(52) U.S. Cl.
CPC ................ *C09J 11/04* (2013.01); *C08K 3/26* (2013.01); *C08K 3/34* (2013.01); *C08K 3/38* (2013.01); *C08K 3/40* (2013.01); *C09J 123/02* (2013.01); *C09J 131/04* (2013.01); *C09J 163/00* (2013.01); *C09J 171/02* (2013.01); *C09J 175/04* (2013.01); *C09J 183/06* (2013.01); *C09K 21/02* (2013.01); *E04B 1/947* (2013.01); *E04B 1/948* (2013.01); *C08K 2003/265* (2013.01); *C08K 2003/343* (2013.01)

(58) Field of Classification Search
CPC ... C08K 3/26; C08K 3/34; C08K 3/38; C08K 3/40; C08K 21/02; C08K 2003/265; C08K 2003/343; C09J 11/04; C09J 123/02; C09J 131/04; C09J 163/00; C09J 171/02; C09J 175/04; C09J 183/06
USPC ........................................................ 524/700
See application file for complete search history.

(56) References Cited

U.S. PATENT DOCUMENTS

| 3,505,278 A | 4/1970 | Elarde et al. |
| 4,579,891 A | 4/1986 | Dugan et al. |
| 4,778,831 A * | 10/1988 | Kemper ................. C08L 67/06 522/18 |
| 4,959,401 A | 9/1990 | Bellasalma et al. |
| 5,961,943 A | 10/1999 | Komatsu et al. |
| 2001/0014714 A1 * | 8/2001 | Amarasekera .......... H01B 3/46 524/588 |

FOREIGN PATENT DOCUMENTS

| CN | 102032344 | 4/2011 |
| CN | 102977434 | 3/2013 |
| CN | 104479213 | 4/2015 |
| CN | 105199270 | 12/2015 |
| CN | 107383576 | 11/2017 |
| EP | 1 457 527 | 9/2004 |
| EP | 3 739 004 | 11/2020 |

(Continued)

OTHER PUBLICATIONS

Office Action issued Aug. 1, 2023 in corresponding Japanese Patent Application No. 2020-518326, with English machine translation.

(Continued)

*Primary Examiner* — Kelechi C Egwim

(74) *Attorney, Agent, or Firm* — Wenderoth, Lind & Ponack, L.L.P.

(57) ABSTRACT

The present invention provides a synthetic resin composition from which a combustion residue produced by combustion is rigid. The synthetic resin composition of the present invention is configured such that the strength of the combustion residue of the composition after combustion in an atmosphere of 800° C. for 20 minutes is 0.5 N/mm² or more. Thus, the combustion residue produced by combustion is very rigid. The combustion residue is capable of reliably holding a state where a joint part is filled therewith and clogged even during a fire, preventing flames from passing through a sealing part such as the joint part, and imparting excellent fire-proof performance to a wall part of a building construction.

13 Claims, No Drawings

(56) References Cited

FOREIGN PATENT DOCUMENTS

| | | |
|---|---|---|
| GB | 2 166 432 | 5/1986 |
| JP | 5441937 | 4/1979 |
| JP | 54-132643 | 10/1979 |
| JP | 58-160386 | 9/1983 |
| JP | 61-34088 | 2/1986 |
| JP | 62-95353 | 5/1987 |
| JP | 62-96377 | 5/1987 |
| JP | 4-265261 | 9/1992 |
| JP | 6-240038 | 8/1994 |
| JP | 10-95608 | 4/1998 |
| JP | 10-297095 | 11/1998 |
| JP | 10-324577 | 12/1998 |
| JP | 10-330623 | 12/1998 |
| JP | 2001-226591 | 8/2001 |
| JP | 2002-265925 | 9/2002 |
| JP | 2004-169019 | 6/2004 |
| JP | 2005-139216 | 6/2005 |
| JP | 2006-199895 | 8/2006 |
| JP | 3848379 | 9/2006 |
| JP | 2009-067916 | 4/2009 |
| JP | 2009-298660 | 12/2009 |
| JP | 2009298660 A * | 12/2009 |
| JP | 2010-70766 | 4/2010 |
| JP | 2010-215742 | 9/2010 |
| JP | 2012-153841 | 8/2012 |
| JP | 2013-49761 | 3/2013 |
| JP | 2013049761 A * | 3/2013 |
| JP | 2016-160145 | 9/2016 |
| JP | 2017-019908 | 1/2017 |
| JP | 2017-210378 | 11/2017 |
| JP | 2019-44138 | 3/2019 |
| WO | 00/20494 | 4/2000 |
| WO | 2019/039611 | 2/2019 |

OTHER PUBLICATIONS

International Search Report issued Aug. 6, 2019 in International (PCT) Application No. PCT/JP2019/018460.
Office Action issued Jan. 25, 2022 in Chinese Patent Application No. 201980030764.6, with English-language translation.
Office Action issued Jan. 24, 2022 in Japanese Patent Application No. 2019-088678, with English-language translation.
Database WPI, Jan. 2017, Week 201713, Thomson Scientific, London, GB; AN 2017-086873.
Database WPI, Apr. 1979, Week 197919, Thomson Scientific, London, GB; AN 1979-36136B.
Extended European Search Report issued Dec. 17, 2021 in corresponding European Patent Application No. 19799878.4.
Notice of Reasons for Refusal issued Jul. 4, 2023 in corresponding Japanese Patent Application No. 2019-088678, with English language translation.
Notice of Reasons for Refusal dated Nov. 28, 2023 in Japanese Patent Application No. 2019-088678, with English-language machine translation.
Notice of Reasons for Refusal issued Oct. 1, 2024 in corresponding Japanese Patent Application No. 2024-006538, with English-language translation.

* cited by examiner

SYNTHETIC RESIN COMPOSITION, FIRE-PROOF MATERIAL, SEALING MATERIAL, ADHESIVE, AND JOINT STRUCTURE

TECHNICAL FIELD

The present invention relates to a synthetic resin composition, a fire-proof material, a sealing material, an adhesive, and a joint structure.

BACKGROUND ART

A joint structure of a building construction is configured so that a joint part formed between wall members constituting a wall part is filled with a sealing material.

In the joint structure described above, the sealing material is an organic substance, and therefore the sealing material has low resistance to combustion. During a fire, the sealing material may be detached from the joint part, and flames may pass through the joint part. Thus, there is a problem that the wall part of the building construction has insufficient fire-proof performance.

Patent Literature 1 discloses a fire-retardant sealing material including (A) a polyalkylene ether having a silicon-containing functional group that may form a silanol group by hydrolysis at the terminal thereof, (B) a microencapsulated ammonium polyphosphate powder, (C) a calcium carbonate powder, and (D) a silanol condensation catalyst.

CITATION LIST

Patent Literature

[PTL 1] Japanese Patent No. 3848379

SUMMARY OF INVENTION

Technical Problem

The fire-retardant sealing material described above is foamed by heat during a fire, and a carbonized layer film is then formed. However, a combustion residue is brittle due to foaming. Therefore, the carbonized layer film is easily broken by a wind pressure of combustion flames, and detached from a joint part. Thus, there is a problem that the fire-retardant sealing material still does not impart sufficient fire-proof performance to a wall part of a building construction.

The present invention provides a synthetic resin composition from which a rigid combustion residue is produced by combustion. The present invention provides a synthetic resin composition that can be suitably used as a fire-proof material, a sealing material, and an adhesive. The present invention provides a sealing material that is capable of reliably holding a state where a sealing part such as a joint part is filled therewith even during a fire, preventing flames from passing through the sealing part, and imparting excellent fire-proof performance to a wall part of a building construction.

Solution to Problem

The synthetic resin composition of the present invention contains a synthetic resin, and the strength of a combustion residue of the composition after combustion in an atmosphere of 800° C. for 20 minutes is 0.5 N/mm² or more.

The strength of the combustion residue of the synthetic resin composition is 0.5 N/mm² or more, preferably 1.0 N/mm² or more, more preferably 2.0 N/mm² or more, further preferably 5.0 N/mm² or more, and particularly preferably 10 N/mm² or more. The strength of the combustion residue of the synthetic resin composition is preferably 20 N/mm² or less. The strength of the combustion residue of 0.5 N/mm² or more can suppress breaking of the combustion residue of the synthetic resin composition or a cured product thereof (hereinafter, the "synthetic resin composition or a cured product thereof" is collectively referred to as "solid body") by a wind pressure or the like. Further, a state where a sealing part such as a joint part is filled with the combustion residue is maintained without detaching it from the sealing part even during a fire, so that the fire-proof performance of a wall part of a building construction is maintained. Further, the combustion residue can stably maintain a decorative article, such as a tile, that is attached to a surface of the wall part using the synthetic resin composition in a state of being attached to the surface of the wall part even during a fire. The strength of the combustion residue of 20 N/mm² or less improves the flexibility of the solid body of the synthetic resin composition. Further, the solid body of the synthetic resin composition can follow extending of a sealing part, reliably maintain a state where the sealing part is filled therewith, and maintain the fire-proof performance of a wall part of a building construction. The solid body of the synthetic resin composition can stably maintain a decorative article, such as a tile, that is attached to a surface of the wall part using the synthetic resin composition in a state of being attached to the surface of the wall part even during a fire.

The strength of the combustion residue of the synthetic resin composition after combustion in an atmosphere of 800° C. for 20 minutes is a value measured by the following procedure.

The synthetic resin composition is melted, then applied to a galvanized steel plate so as to have a thickness of 10 mm, a width of 10 mm, and a length of 50 mm, and aged in an environment of 23° C. and a relative humidity of 50% for 1 month. Thus, the synthetic resin composition is cured or solidified to obtain a specimen.

The specimen is left in a constant temperature bath of 800° C. for 20 minutes, burned, taken from the constant temperature bath, and then left in an atmosphere of 23° C. and a relative humidity of 50% for 3 hours, to produce a combustion residue.

The combustion residue is compressed at a compression speed of 50 mm/min by a needle with a diameter of 1.5 mm using a universal testing machine to measure the film strength of the combustion residue, which is defined as the strength of the combustion residue.

The 50% modulus of the synthetic resin composition after aging an I-type specimen in accordance with NPO JAPAN EXTERIOR FURNISING TECHNICAL CENTER standard JTC S-0001 at 23° C. and a relative humidity of 50% for 28 days is preferably 0.05 to 0.40 N/mm². The synthetic resin composition with the 50% modulus falling within the aforementioned range has excellent flexibility. The synthetic resin composition smoothly follows a change of a gap size of a sealing part, to reliably hold a state where the sealing part is filled therewith. Further, the synthetic resin composition can stably maintain a decorative article, such as a tile, that is attached to a surface of the wall part using the synthetic resin composition in a state of being attached to the surface of the wall part even during a fire.

The elongation ratio of the synthetic resin composition after aging an I-type specimen in accordance with NPO JAPAN EXTERIOR FURNISING TECHNICAL CENTER standard JTC S-0001 at 23° C. and a relative humidity of 50% for 28 days is preferably 400% or more. The solid body of the synthetic resin composition has excellent flexibility. The size of a sealing part such as a joint part formed between wall members constituting a wall part varies depending on vibration of an earthquake or expansion and contraction of the wall members caused by temperature variation. The solid body of the synthetic resin composition that has the foregoing elongation ratio of 400% or more smoothly follows a change of the size of the sealing part without breaking, to maintain a clogged state of the joint part. Thus, excellent waterproof property can be exhibited. Further, the solid body of the synthetic resin composition can stably maintain a decorative article, such as a tile, that is attached to a surface of the wall part using the synthetic resin composition in a state of being attached to the surface of the wall part even during a fire.

The 50% modulus and the elongation ratio after aging an I-type specimen in accordance with NPO JAPAN EXTERIOR FURNISING TECHNICAL CENTER standard JTC S-0001 at 23° C. for 28 days are values measured by the following procedure. An I-type specimen in accordance with NPO JAPAN EXTERIOR FURNISING TECHNICAL CENTER standard JTC S-0001 is produced using the synthetic resin composition. The obtained I-type specimen is aged at 23° C. and a relative humidity of 50% for 28 days, and if necessary, cured, to produce a specimen. The 50% modulus and the elongation ratio of the specimen are measured in accordance with NPO JAPAN EXTERIOR FURNISING TECHNICAL CENTER standard JTC S-0001.

The synthetic resin composition can be suitably used as an adhesive as described below. The shear strength of the adhesive is preferably 1.0 N/mm$^2$ or more. The shear strength of the adhesive of 1.0 N/mm$^2$ or more improves the adherence property of the adhesive. The shear strength of the adhesive is a value measured in accordance with JIS K6850.

The strength of the combustion residue of the synthetic resin composition after combustion in an atmosphere of 800° C. for 20 minutes is preferably 0.5 N/mm$^2$ or more. The synthetic resin composition is not particularly limited, but preferably contains the synthetic resin, a mineral having a Mohs hardness of 5 or more, and a binder component.

Next, the synthetic resin composition containing the synthetic resin, a mineral having a Mohs hardness of 5 or more, and a binder component will be described.

[Synthetic Resin]

The synthetic resin is not particularly limited. The synthetic resin may be a non-curable resin or a curable resin, but a curable resin is preferable. The non-curable resin is preferably a solid at 23° C. and 1.01×10$^5$ Pa (1 atm). The curable resin is preferably a solid at 23° C. and 1.01×10$^5$ Pa (1 atm) after cured.

The number-average molecular weight of the non-curable resin is preferably more than 10,000, and preferably 10,100 or more. The number-average molecular weight of the synthetic resin is preferably 1,000,000 or less. The number-average molecular weight of a one-component curable resin is preferably more than 10,000, and preferably 10,100 or more. The number-average molecular weight of the synthetic resin is preferably 1,000,000 or less. The number-average molecular weight of the synthetic resin is a value measured in the same manner as a method of measuring the number-average molecular weight of a polyalkylene oxide having a hydrolyzable silyl group described below.

Examples of the non-curable resin include a rubber-based polymer and a polyolefin-based polymer (e.g., a polyethylene-based resin and a polypropylene-based resin).

Examples of the rubber-based polymer include an ethylene-propylene rubber (EPM), a natural rubber, an isoprene rubber, a butadiene rubber, a butyl rubber, a styrene-butadiene rubber, a styrene-isoprene rubber, a styrene-isoprene-butadiene rubber, an acrylonitrile-butadiene rubber, and an ethylene-vinyl acetate copolymer.

The curable resin contains a one-component type curable resin and a two-component type curable resin.

[One-Component Curable Resin]

Examples of the one-component type curable resin include a polymer having a hydrolyzable silyl group and a polymer having a hydrolyzable isocyanate group. The curable resin preferably contains a polymer having a hydrolyzable silyl group. A hydrolysable group of the hydrolyzable silyl group of the polymer having a hydrolyzable silyl group is hydrolyzed in the presence of water to produce silanol groups (—SiOH). The silanol groups are dehydrated and condensed with each other to form a crosslinking structure. From the hydrolyzable isocyanate group of the polymer having a hydrolyzable isocyanate group, while carbon dioxide is produced in the presence of water, a urea bond (—NHCONH—) is produced to form a crosslinking structure.

The hydrolyzable silyl group is a group in which 1 to 3 hydrolyzable groups are bonded to a silicon atom. The hydrolyzable groups of the hydrolyzable silyl group are not particularly limited, and examples thereof include a hydrogen atom, a halogen atom, an alkoxy group, an acyloxy group, a ketoxymate group, an amino group, an amide group, an acid amide group, an aminooxy group, a mercapto group, an alkenyloxy group, and an oxime group.

Among these, as the hydrolyzable silyl group, an alkoxysilyl group is preferable because the hydrolysis reaction is moderate. Examples of the alkoxysilyl group include trialkoxysilyl groups, such as a trimethoxysilyl group, a triethoxysilyl group, a triisopropoxysilyl group, and a triphenoxysilyl group; dialkoxysilyl groups, such as a propyldimethoxysilyl group, a methyldimethoxysilyl group, and a methyldiethoxysilyl group; and monoalkoxysilyl groups, such as a dimethylmethoxysilyl group and a dimethylethoxysilyl group.

The hydrolyzable isocyanate group refers to an isocyanate group capable of forming a urea bond (—NHCONH—) by hydrolysis.

[Polymer Having Hydrolyzable Silyl Group]

The polymer having a hydrolyzable silyl group are not particularly limited, and examples thereof include a polyalkylene oxide having a hydrolyzable silyl group, an acrylic polymer having a hydrolyzable silyl group, a silicone resin having a hydrolyzable silyl group, a urethane resin having a hydrolyzable silyl group, and a polyolefin-based resin having a hydrolyzable silyl group. The polymer having a hydrolyzable silyl group preferably contains a polyalkylene oxide having a hydrolyzable silyl group, and more preferably contains a polyalkylene oxide having a hydrolyzable silyl group and an acrylic polymer having a hydrolyzable silyl group. The polymer having a hydrolyzable silyl group may be used alone, and two or more kinds thereof may be used in combination.

[Polyalkylene Oxide Having Hydrolyzable Silyl Group]

The hydrolyzable silyl group contained in the polyalkylene oxide having a hydrolyzable silyl group is preferably an alkoxysilyl group, more preferably a dialkoxysilyl group, more preferably a dimethoxysilyl group, and particularly preferably a propyldimethoxysilyl group.

The polyalkylene oxide having a hydrolyzable silyl group preferably has 1 to 4 hydrolyzable silyl groups per molecule on average. The polyalkylene oxide having a hydrolyzable silyl group of which number falls within the aforementioned range allows the combustion residue of the solid body of the synthetic resin composition to be stably held. For example, the combustion residue of the solid body of the synthetic resin composition can be stably held in a sealing part such as a joint part, and the fire-proof performance of a wall part of a building construction can be maintained. The polyalkylene oxide having a hydrolyzable silyl group preferably has a hydrolyzable silyl group at at least one of both ends of a main chain thereof.

The average number of the hydrolyzable silyl groups per molecule in the polyalkylene oxide having a hydrolyzable silyl group can be calculated on the basis of the concentration of the hydrolyzable silyl group in the polyalkylene oxide determined by $^1$H-NMR and the number-average molecular weight of the polyalkylene oxide determined by a GPC method.

Examples of the polyalkylene oxide constituting the polyalkylene oxide having a hydrolyzable silyl group preferably include a polymer whose main chain contains a repeating unit represented by the general formula: —(R—O)$_n$— (in the formula, R represents an alkylene group having 1 to 14 carbons, and n is the number of repeating units and is a positive integer). The main chain skeleton of the polyalkylene oxide may be composed of only one kind of repeating unit, or may be composed of 2 or more kinds of repeating units.

Examples of the main chain skeleton of the polyalkylene oxide include polyethylene oxide, polypropylene oxide, polybutylene oxide, polytetramethylene oxide, a polyethylene oxide-polypropylene oxide copolymer, and a polypropylene oxide-polybutylene oxide copolymer. Among these, polypropylene oxide is preferable. The polypropylene oxide can impart excellent rubber elasticity and adherence property to the solid body of the synthetic resin composition.

The number-average molecular weight of the polyalkylene oxide having a hydrolyzable silyl group is preferably 3,000 to 50,000, and more preferably 10,000 to 30,000. The polyalkylene oxide with the number-average molecular weight of 3,000 or more improves the mechanical strength or elongation of the solid body of the synthetic resin composition. The polyalkylene oxide with the number-average molecular weight of 50,000 or less improves the coating properties of the synthetic resin composition.

In the present invention, the number-average molecular weight of the polyalkylene oxide having a hydrolyzable silyl group means a value in terms of polystyrene measured by a GPC (gel permeation chromatography) method. In measurements by the GPC method, for example, Shodex KF800D manufactured by Tosoh Corporation may be used as a GPC column, and chloroform and the like may be used as a solvent.

A commercial product may be used as the polyalkylene oxide having a hydrolyzable silyl group. Examples of the polyalkylene oxide having a hydrolyzable silyl group include trade name "MS polymer S-203," "MS polymer S-303," "Silyl polymer SAT-200," "Silyl polymer SAT-350," and "Silyl polymer SAT-400," manufactured by Kaneka Corporation. Examples of the polyalkylene oxide having a hydrolyzable silyl group include trade name "EXCESTAR ESS-3620," "EXCESTAR ESS-2420," "EXCESTAR ESS2410," and "EXCESTAR ESS3430," manufactured by AGC Inc.

The polyalkylene oxide having a main chain of polypropylene oxide and a (methoxymethyl) dimethoxysilyl group at the end of the polypropylene oxide is commercially available from Kaneka Corporation under the trade name "HS-2."

The polyalkylene oxide having a main chain of polypropylene oxide and an isopropyldimethoxymethylsilyl group at the end of the polypropylene oxide is commercially available from Kaneka Corporation under the trade name "SAX720."

[Acrylic Polymer Having Hydrolyzable Silyl Group]

As the hydrolyzable silyl group contained in the acrylic polymer having a hydrolyzable silyl group, an alkoxysilyl group is preferable because the hydrolysis reaction is moderate. A trialkoxysilyl group is more preferable, and a trimethoxysilyl group is particularly preferable.

The acrylic polymer having a hydrolyzable silyl group preferably has 1 to 2 hydrolyzable silyl groups in one molecule on average. The acrylic polymer having a hydrolyzable silyl group more preferably has 1 to 1.8 hydrolyzable silyl groups in one molecule on average. The acrylic polymer having the number of hydrolyzable silyl groups of 1 or more improves the curability of the synthetic resin composition. The acrylic polymer having the number of hydrolyzable silyl groups of 1.8 or less improves the mechanical strength or elongation ratio of the solid body of the synthetic resin composition. The acrylic polymer having a hydrolyzable silyl group preferably has a hydrolyzable silyl group at at least one of both ends of a main chain thereof.

The acrylic polymer having a hydrolyzable silyl group may be used in combination with an acrylic polymer having no hydrolyzable silyl group. In this case, the number of hydrolyzable silyl groups per molecule in both as a whole is preferably 0.3 or more, and more preferably 0.5 or more. The acrylic polymer having the number of hydrolyzable silyl groups of 0.3 or more as a whole improves the curability of the synthetic resin composition. On the other hand, the number of hydrolyzable silyl groups per molecule in both as a whole is preferably 2.0 or less, and more preferably 1.8 or less. The acrylic polymer having the number of hydrolyzable silyl groups of 2.0 or less as a whole improves the mechanical strength or elongation ratio of the solid body of the synthetic resin composition.

The method of introducing the hydrolyzable silyl group into the acrylic polymer is not particularly limited, and examples thereof include a method in which an unsaturated group is introduced into a copolymer of a monomer which is to constitute the main chain skeleton, and then the copolymer is reacted with hydrosilane having a hydrolyzable silyl group to hydrosilylate it.

The average number of the hydrolyzable silyl groups per molecule in the acrylic polymer having a hydrolyzable silyl group is calculated on the basis of the concentration of the hydrolyzable silyl group in the acrylic polymer having a hydrolyzable silyl group determined by $^1$-NMR and the number-average molecular weight of the acrylic polymer having a hydrolyzable silyl group determined by a GPC method.

The main chain skeleton of the acrylic polymer having a hydrolyzable silyl group is preferably a copolymer of a monomer containing methyl (meth)acrylate and butyl (meth)acrylate, more preferably a copolymer of a monomer containing methyl methacrylate and butyl acrylate, and particularly preferably a copolymer of a monomer containing methyl methacrylate and n-butyl acrylate. The acrylic polymer having a hydrolyzable silyl group whose main chain skeleton is the foregoing copolymer improves the weather resistance of the synthetic resin composition, and thus this is preferable. It should be noted that (meth)acrylate means methacrylate and/or acrylate.

The content of the methyl (meth)acrylate component in the acrylic polymer having a hydrolyzable silyl group is preferably 3 to 70% by mass, and more preferably 5 to 50% by mass. The methyl (meth)acrylate component contained in an amount of 3% by mass or more improves the adherence property of the synthetic resin composition. The methyl (meth)acrylate component contained in an amount of 70% by mass or less improves the flexibility of the solid body of the synthetic resin composition.

The content of the butyl (meth)acrylate component in the acrylic polymer having a hydrolyzable silyl group is preferably 30 to 97% by mass, and more preferably 50 to 95% by mass. The butyl (meth)acrylate component contained in an amount of 30% by mass or more makes the solid body of the synthetic resin composition flexible and follow a sealing part such as a joint part, and thus this is preferable.

In the acrylic polymer having a hydrolyzable silyl group, the monomer used in the polymer constituting the main chain skeleton may further contain other monomers in addition to methyl acrylate, methyl methacrylate, butyl acrylate, and butyl methacrylate. Examples of the other monomers include styrene, indene, styrene derivatives, such as α-methylstyrene, p-methylstyrene, p-chlorostyrene, p-chloromethylstyrene, p-methoxystyrene, p-tert-butoxystyrene, and divinylbenzene, compounds having a vinyl ester group, such as vinyl acetate, vinyl propionate, vinyl butyrate, vinyl caproate, vinyl benzoate, and vinyl cinnamate, maleic anhydride, N-vinylpyrrolidone, N-vinylmorpholine, methacrylonitrile, acrylonitrile, acrylamide, methacrylamide, N-cyclohexylmaleimide, N-phenylmaleimide, N-laurylmaleimide, N-benzylmaleimide, and compounds having a vinyloxy group such as n-propyl vinyl ether, n-butyl vinyl ether, isobutyl vinyl ether, tert-butyl vinyl ether, tert-amyl vinyl ether, cyclohexyl vinyl ether, 2-ethylhexyl vinyl ether, dodecyl vinyl ether, octadecyl vinyl ether, 2-chloroethyl vinyl ether, ethylene glycol butyl vinyl ether, triethylene glycol methyl vinyl ether, (4-vinyloxy) butyl benzoate, ethylene glycol divinyl ether, diethylene glycol divinyl ether, triethylene glycol divinyl ether, tetraethylene glycol divinyl ether, butane-1,4-diol-divinyl ether, hexane-1,6-diol-divinyl ether, cyclohexane-1,4-dimethanol-divinyl ether, di(4-vinyloxy)butyl isophthalate, di(4-vinyloxy)butyl glutarate, di(4-vinyloxy)butyltrimethylolpropane trivinyl ether succinate, 2-hydroxyethyl vinyl ether, 4-hydroxybutyl vinyl ether, 6-hydroxyhexyl vinyl ether, cyclohexane-1,4-dimethanol monovinyl ether, diethylene glycol monovinyl ether, 3-aminopropyl vinyl ether, 2-(N,N-diethylamino) ethyl vinyl ether, a urethane vinyl ether, and a polyester vinyl ether. These monomers may be used alone, and two or more kinds thereof may be used in combination.

The method for polymerizing an acrylic polymer having a hydrolyzable silyl group is not particularly limited, and any known method can be adopted. Examples thereof include various polymerization methods such as a free radical polymerization method, an anionic polymerization method, a cationic polymerization method, a UV radical polymerization method, a living anionic polymerization method, a living cationic polymerization method, and a living radical polymerization method.

The weight-average molecular weight of the acrylic polymer having a hydrolyzable silyl group is preferably 1,000 to 50,000, more preferably 2,000 to 30,000, and particularly preferably 3,000 to 15,000. The acrylic polymer having a hydrolyzable silyl group having a weight-average molecular weight falling within the foregoing range improves flexibility and elongation of the solid body of the synthetic resin composition.

[Silicone Resin Having Hydrolyzable Silyl Group]

A silicone resin refers to a polymer having a main chain formed by repeatedly forming a siloxane bond (Si—O—Si). The silicone resin having a hydrolyzable silyl group has a plurality of hydrolyzable silyl groups in the main chain of the silicone resin. The silicone resin having a hydrolyzable silyl group preferably has a hydrolyzable silyl group at both ends of the main chain of the silicone resin. As the hydrolyzable silyl group contained in the silicone resin having a hydrolyzable silyl group, an oxime silyl group is preferable, and a ketoxime silyl group is more preferable.

[Urethane Resin Having Hydrolyzable Silyl Group]

A urethane resin refers to a polymer having a main chain formed by repeatedly forming a urethane bond (—NHCOO—). The urethane resin having a hydrolyzable silyl group has a plurality of hydrolyzable silyl groups in a main chain of the urethane resin. The urethane resin having a hydrolyzable silyl group preferably has a hydrolyzable silyl group at both ends of the main chain of the urethane resin.

[Polyolefin-Based Resin Having Hydrolyzable Silyl Group]

Examples of the polyolefin-based resin include a polyethylene-based resin and a polypropylene-based resin. The polyolefin-based resin having a hydrolyzable silyl group has a plurality of hydrolyzable silyl groups in a main chain of the polyolefin-based resin. The polyolefin-based resin having a hydrolyzable silyl group preferably has a hydrolyzable silyl group at both ends of the main chain of the polyolefin-based resin.

[Polymer Having Hydrolyzable Isocyanate Group]

Examples of the polymer having a hydrolyzable isocyanate group include a urethane resin having a hydrolyzable isocyanate group. A urethane resin refers to a polymer having a main chain formed by repeatedly forming a urethane bond (—NHCOO—). The urethane resin having a hydrolyzable isocyanate group has a plurality of hydrolyzable isocyanate groups in a main chain of the urethane resin. The urethane resin having a hydrolyzable isocyanate group preferably has a hydrolyzable isocyanate group at both ends of the main chain of the urethane resin. The urethane resin includes a polyether-based urethane resin using a polyether polyol as a raw material and a polyester-based urethane resin using a polyester polyol as a raw material, but any of these resins may be used.

[Two-Component Curable Resin]

The two-component curable resin is not particularly limited, and examples thereof include an isocyanate-based polymer and a glycidyl-based polymer.

The isocyanate-based polymer is a two-component type curable resin including a main agent containing a polyisocyanate and a curing agent containing a polyol. A urethane bond is formed by mixing the main agent and the curing agent to react the polyisocyanate with the polyol to crosslink and cure the resin.

Examples of the polyisocyanate include an aromatic aliphatic diisocyanate, an aliphatic diisocyanate, and an alicyclic diisocyanate. Examples of the aromatic aliphatic diisocyanate include diphenylmethane diisocyanate, 1,3-xylylenediisocyanate, 1,4-xylylenediisocyanate, 1,3-bis(1-isocyanato-1-methylethyl)benzene, 1,4-bis(1-isocyanato-1- methylethyl)benzene, ω,ω'-diisocyanato-1,4-diethylbenzene, and a urethane prepolymer having an isocyanate group at both ends.

Examples of the aliphatic diisocyanate include hexamethylene diisocyanate, tetramethylene diisocyanate, 2-methylpentane-1,5-diisocyanate, 3-methyl-pentane-1,5-diisocyanate, lysine diisocyanate, and trioxyethylene diisocyanate.

Examples of the alicyclic diisocyanate include isophorone diisocyanate, cyclohexyl diisocyanate, hydrogenated diphenylmethane diisocyanate, norbornane diisocyanate, hydrogenated tolylene diisocyanate, hydrogenated xylene diisocyanate, and hydrogenated tetramethylxylene diisocyanate.

Examples of the polyol include a polyurethane polyol, a polyester polyol, a polyether polyol, an acrylic polyol, a polyolefin polyol, and a castor oil polyol.

The glycidyl-based polymer is a two-component type curable resin composed of a main agent containing an epoxy resin and a curing agent. The epoxy resin is not particularly limited, and examples thereof include a bisphenol A type epoxy resin obtained by reacting bisphenol A with epichlorohydrin, a bisphenol F type epoxy resin obtained by reacting bisphenol F with epichlorohydrin, and hydrogenated products thereof, a glycidyl ester-type epoxy resin, a novolac-type epoxy resin, a urethane-modified epoxy resin, a nitrogen-containing epoxy resin such as triglycidyl isocyanurate, and a rubber-modified epoxy resin containing polybutadiene or NBR.

The curing agent is not particularly limited, and examples thereof include an amine-based curing agent, an acid anhydride-based curing agent, a polyamide-based curing agent, an imidazole-based curing agent, and a polymercaptan-based curing agent.

Examples of the amine-based curing agent include aliphatic polyamines, such as polyoxypropylenetriamine, diethylenetriamine, and triethylenetetramine, and aromatic polyamines, such as metaphenylenediamine, diaminodiphenylmethane, diaminodiphenylsulfone, and 2,4,6-tris(dimethylaminomethyl)phenol.

Examples of the acid anhydride-based curing agent include tetrahydrophthalic anhydride, hexahydrophthalic anhydride, methyl tetrahydrophthalic anhydride, methylnadic anhydride, pyromellitic anhydride, Het anhydride, and dodecenyl succinic anhydride. Examples of the polyamide-based curing agent include dimer acid.

The synthetic resin preferably contains a polymer having a hydrolyzable silyl group and a glycidyl-based polymer, more preferably contains a polyalkylene oxide having a hydrolyzable silyl group and a glycidyl-based polymer, and particularly preferably contains a polyalkylene oxide having a hydrolyzable silyl group, a glycidyl-based polymer, and an acrylic polymer having a hydrolyzable silyl group. The synthetic resin containing a polymer having a hydrolyzable silyl group and a glycidyl-based polymer can allow the combustion residue of the solid body of the synthetic resin composition to be stably held. For example, the combustion residue of the solid body of the synthetic resin composition can be stably held in a sealing part such as a joint part, and the fire-proof performance of the wall part of the building construction can be maintained. Further, the combustion residue of the solid body of the synthetic resin composition can stably maintain a decorative article, such as a tile, that is attached to a surface of the wall part using the synthetic resin composition in a state of being attached to the surface of the wall part even during a fire.

When the synthetic resin contains a polymer having a hydrolyzable silyl group and a glycidyl-based polymer, the content of the glycidyl-based polymer is preferably 1 to 100 parts by mass, more preferably 5 to 60 parts by mass, still more preferably 7 to 50 parts by mass, and particularly preferably 8 to 40 parts by mass, relative to 100 parts by mass of the polymer having a hydrolyzable silyl group. The glycidyl-based polymer contained in an amount of 1 part by mass or more can allow the combustion residue of the solid body of the synthetic resin composition to be stably held. The glycidyl-based polymer contained in an amount of 100 parts by mass or less can make the solid body of the synthetic resin composition achieve both flexibility of the polymer having a hydrolyzable silyl group and toughness of the glycidyl-based polymer, and thus this is preferable.

[Mineral]

The synthetic resin composition contains the mineral having a Mohs hardness of 5 or more. Examples of the minerals having a Mohs hardness of 5 or more include feldspars, iron oxide, titanium oxide, silica ($SiO_2$), quartz, α-alumina, silicon carbide, and boron carbide. Feldspars, titanium oxide, and α-alumina are preferable, feldspars and α-alumina are more preferable, and feldspars is particularly preferable.

The Mohs hardness of minerals is measured by the following procedure. Ten kinds of standard minerals having different hardnesses (standard minerals having a Mohs hardness of 1 to 10 (integer)) are prepared. The standard minerals having lower Mohs hardness are rubbed in turn on a surface of a mineral to be measured. Among standard minerals that do not damage the surface of the mineral to be measured, the Mohs hardness of the standard mineral having the highest Mohs hardness is considered as the Mohs hardness of the mineral.

Feldspars Include Feldspar and Feldspathoid. Feldspathoid is preferable. Feldspars may be used alone, and two or more kinds thereof may be used in combination.

Examples of the feldspar include alkaline feldspars such as orthoclase, sanidine, microcline, and anorthoclase; and plagioclase feldspar such as albite, oligoclase, andesine, labradorite, bytownite, and anorthite.

Examples of the feldspathoid include nepheline such as kalsilite and cancrinite, nepheline syenite, amphigene (leucite), sodalite, hauynite, lazurite, noselite (nosean), and melilite, with nepheline syenite being preferable. Note that the nepheline syenite may be described as a syenite.

The average particle diameter of the mineral is 0.01 to 100 μm, preferably 0.1 to 50 μm, more preferably 1 to 25 μm, particularly preferably 2 to 15 μm, and particularly preferably 3 to 10 μm. The mineral having the average particle diameter of 0.01 μm or more is preferable since the combustion residue of the solid body of the synthetic resin composition has excellent strength. The mineral having an average particle diameter of 100 μm or less can be uniformly dispersed in the synthetic resin composition. In this case, the combustion residue of the solid body of the synthetic resin composition has excellent strength.

The average particle diameter of the mineral is a value measured by image analysis using a transmission electron microscope. Specifically, the minerals are photographed at a magnification of 100 by a transmission electron microscope to obtain an enlarged photograph. 50 minerals are optionally extracted, and the diameter of each of the minerals is measured. The arithmetic mean of the diameter thereof is considered as the average particle diameter of the mineral. The diameter of a mineral represents a diameter of a perfect circle with the shortest diameter capable of surrounding the mineral.

The content of the mineral in the synthetic resin composition is preferably 1 to 800 parts by mass, preferably 30 to 600 parts by mass, more preferably 50 to 450 parts by mass, particularly preferably 80 to 300 parts by mass, and the most preferably 120 to 200 parts by mass, relative to 100 parts by mass of the synthetic resin. The mineral contained in an amount falling within the aforementioned range allows the combustion residue of the solid body of the synthetic resin composition to have excellent strength, and the combustion residue does not become too hard, so that cracks do not occur. Therefore, the combustion residue can reliably maintain the state of filling the sealing part such as a joint part therewith, and also maintain the fire-proof performance of the wall part of the building construction. Further, the combustion residue can stably maintain a decorative article, such as a tile, that is attached to a surface of the wall part using the synthetic resin composition in a state of being attached to the surface of the wall part even during a fire.

[Binder Component]

The synthetic resin composition contains a binder component in order to bond the minerals together in the combustion residue of the solid body of the synthetic resin composition.

The binder component is not particularly limited, but glass frit (glass powder) and a boric acid compound are preferable, and glass frit is preferable. The binder component may be used alone, and two or more kinds thereof may be used in combination.

[Glass Frit]

Examples of the glass constituting the glass frit include a phosphoric acid-based glass, a boric acid-based glass, a bismuth oxide-based glass, a silicic acid-based glass, and a sodium oxide-based glass. A phosphoric acid-based glass and a boric acid-based glass are preferable, and a phosphoric acid-based glass is more preferable. These glass frits can be obtained by adjusting $B_2O_3$, $P_2O_5$, ZnO, $SiO_2$, $Bi_2O_3$, $Al_2O_3$, BaO, CaO, MgO, $MnO_2$, $ZrO_2$, $TiO_2$, $CeO_2$, SrO, $V_2O_5$, $SnO_2$, $Li_2O$, $Na_2O$, $K_2O$, CuO, $Fe_2O_3$ and the like at predetermined component ratios. The glass frit may be used alone, and two or more kinds thereof may be used in combination.

The softening point of the glass constituting the glass frit is preferably 350 to 650° C., more preferably 360 to 560° C., particularly preferably 370 to 540° C., and most preferably 380 to 520° C. Note that the softening point of the glass constituting the glass frit is a temperature at which the viscosity of the glass becomes 107.6 dPa·s=7.6)

[Boric Acid Compound]

The boric acid compound is not particularly limited, and examples thereof include zinc borate, ammonium borate, sodium borate, potassium borate, and calcium borate. Zinc borate is preferable.

The content of the binder component in the synthetic resin composition is preferably 2 to 120 parts by mass, more preferably 5 to 100 parts by mass, still more preferably 8 to 90 parts by mass, particularly preferably 25 to 90 parts by mass, and most preferably 30 to 60 parts by mass, relative to 100 parts by mass of the synthetic resin. The binder component contained in an amount falling within the foregoing range allows the combustion residue of the solid body of the synthetic resin composition to have excellent strength, and the combustion residue does not become too hard, so that cracks do not occur. Therefore, the combustion residue can reliably maintain the state of filling the sealing parts such as joint parts therewith, and also maintain the fire-proof performance of the wall part of the building construction. Further, the combustion residue can stably maintain a decorative article, such as a tile, that is attached to a surface of the wall part using the synthetic resin composition in a state of being attached to the surface of the wall part even during a fire.

In the synthetic resin composition, the ratio of the content of the mineral to the content of the binder component (the content of the mineral/the content of the binder component) is preferably 1 to 20, more preferably 2 to 15, still more preferably 2.5 to 12, particularly preferably 3 to 10, and most preferably 3.5 to 7. Therefore, the synthetic resin composition with the ratio of the content of the mineral to the content of the binder component (the content of the mineral/the content of the binder component) falling within the foregoing range allows the combustion residue of the solid body of the synthetic resin composition to have excellent strength, and the combustion residue does not become too hard, so that cracks do not occur. Therefore, the combustion residue can reliably maintain the state of filling the sealing parts such as joint parts therewith, and also maintain the fire-proof performance of the wall part of the building construction. Further, the combustion residue can stably maintain a decorative article, such as a tile, that is attached to a surface of the wall part using the synthetic resin composition in a state of being attached to the surface of the wall part even during a fire.

[Expansion Agent]

The synthetic resin composition may contain an expansion agent. A sealing part such as a joint part formed in a wall part of a building construction is filled with the solid body of the synthetic resin composition. For example, a wall member constituting the wall part is contracted by heat during a fire, and as a result, the joint part formed between the wall members is expanded.

The expansion agent contained in the synthetic resin composition can expand the solid body of the synthetic resin composition during combustion of the solid body, and thus this is preferable. In particular, the solid body of the synthetic resin composition is allowed to smoothly follow expanding of the sealing part during combustion of the solid body, to reliably maintain clogging of the sealing part.

The expansion agent is not particularly limited, and calcium carbonate (Mohs hardness: 3), a compound containing magnesium silicate (Mohs hardness: 1), expanded graphite (Mohs hardness: 1), aluminum hydroxide (Mohs hardness: 3), and magnesium hydroxide (Mohs hardness: 3) are preferable. Since the strength of the combustion residue of the solid body of the synthetic resin composition is high, calcium carbonate and a compound containing magnesium silicate are more preferable, and a compound containing magnesium silicate is particularly preferable. The expansion agent may be used alone, and two or more kinds thereof may be used in combination. The Mohs hardness of the expansion agent is preferably 3 or less. The expansion agent having a Mohs hardness of 3 or less allows the solid body of the synthetic resin composition to be smoothly expanded during combustion of the solid body. The Mohs hardness of the expansion agent is measured in the same manner as that for measurement of the Mohs hardness of the minerals.

[Compound Containing Magnesium Silicate]

The compound containing magnesium silicate is not particularly limited and includes a natural compound containing magnesium silicate. Examples thereof include compounds containing magnesium silicate such as sepiolite, attapulgite, talc, forsterite, humite, enstatite, clinoenstatite, and chrysotile, and magnesium calcium silicates such as akermanite, magnesia axinite, diopsite, and tremolite. Sepiolite, attapulgite, and talc are more preferable in terms of improving the strength of the combustion residue, and sepiolite is more preferable.

[Calcium Carbonate]

Calcium carbonate is not particularly limited, and examples thereof include colloidal calcium carbonate, heavy calcium carbonate, and light calcium carbonate. Colloidal calcium carbonate and heavy calcium carbonate are preferable, and colloidal calcium carbonate is more preferable.

The average particle diameter of calcium carbonate is preferably 0.01 to 5 µm, and more preferably 0.05 to 2.5 µm. The calcium carbonate having such an average particle diameter allows the combustion residue of the solid body of the synthetic resin composition to have excellent strength, and the combustion residue does not become too hard, so that cracks do not occur. Therefore, the combustion residue can reliably maintain the state of filling the sealing parts such as joint parts therewith, and also maintain the fire-proof performance of the wall part of the building construction. The average particle diameter of calcium carbonate refers to a value obtained by measuring 10 particles with a scale by observation with SEM and averaging the values.

Calcium carbonate is preferably subjected to a surface treatment with a fatty acid, a fatty acid ester, or the like. Calcium carbonate having been subjected to a surface treatment with a fatty acid, a fatty acid ester, or the like can impart a thixotropic property to the synthetic resin composition and can suppress aggregation of the calcium carbonate.

[Expanded Graphite]

Expanded graphite is produced by treating natural graphite or synthetic graphite with an intercalant material such as an acid, an oxidized body, and a halide to form an intercalation compound, and rapidly heating a powder of the intercalation compound (1,000 to 1,200° C.), to expand the powder about 150 to 700 times in a c axial direction of the graphite.

Examples of the intercalant material include sulfuric acid, nitric acid, chromic acid, boric acid, $SO_3$, and a halide such as $FeCl_3$, $ZnCl_2$, and $SbCl_5$.

The content of the expansion agent in the synthetic resin composition is preferably 1 to 100 parts by mass, preferably 2 to 50 parts by mass, and particularly preferably 2 to 30 parts by mass, relative to 100 parts by mass of the synthetic resin. The expansion agent contained in an amount falling within the aforementioned range allows the solid body of the synthetic resin composition to be expanded during combustion, to smoothly follow a change in size such as expanding of a sealing part. Thus, a state where the sealing part is clogged can be reliably maintained. In a case of using natural minerals containing magnesium silicate as an expansion agent, it is only necessary to adjust the content of magnesium silicate in the natural minerals to be within the aforementioned range.

In the synthetic resin composition, the ratio of the content of the mineral to the content of the expansion agent (the content of the mineral/the content of the expansion agent) is preferably 1 or more, more preferably 3 or more, still more preferably 10 or more, and particularly preferably 20 or more because it can improve the strength of the combustion residue of the synthetic resin composition and suppress the occurrence of cracks in the solid body of the synthetic resin composition. In the synthetic resin composition, the ratio of the content of the mineral to the content of the expansion agent (the content of the mineral/the content of the expansion agent) is preferably 350 or less, more preferably 200 or less, still more preferably 100 or less, still more preferably 80 or less, and particularly preferably 60 or less, because the sealing part can be effectively clogged. When a natural mineral containing magnesium silicate is used as the expansion agent, it may be adjusted so that magnesium silicate in the natural mineral falls within the foregoing range.

[Plasticizer]

The synthetic resin composition preferably contains a plasticizer. Examples of the plasticizer include phthalate esters, such as dimethyl phthalate, diethyl phthalate, dibutyl phthalate, diisobutyl phthalate, di-normal hexyl phthalate, bis(2-ethylhexyl) phthalate, di-normaloctyl phthalate, diisononyl phthalate, dinonyl phthalate, diisodecyl phthalate, diisoundecyl phthalate, and bisbutylbenzyl phthalate; and polyalkylene glycols, such as diethylene glycol, triethylene glycol, tetraethylene glycol, dipropylene glycol, tripropylene glycol, tetrapropylene glycol, and polypropylene glycol. Among these, polyalkylene glycol is preferable, and polypropylene glycol is more preferable. The plasticizer is preferably in a liquid state at 23° C. and $1.01 \times 10^5$ Pa (1 atm).

When the plasticizer is a polymer, the number-average molecular weight of the plasticizer is preferably 1,000 to 10,000, and more preferably 2,000 to 5,000. The plasticizer having the number-average molecular weight falling within the foregoing range allows the combustion residue of the solid body of the synthetic resin composition to be stably held in the sealing part such as the joint part, so that excellent fire-proof performance can be imparted to the wall part of the building construction.

In the present invention, when the plasticizer is a polymer, the number-average molecular weight of the plasticizer is a value measured in terms of polystyrene by a GPC (gel permeation chromatography) method. Specific measurement methods and measurement conditions are the same as those for the above-described polyalkylene oxide.

The content of the plasticizer in the synthetic resin composition is preferably 1 to 50 parts by mass, and more preferably 10 to 40 parts by mass, relative to 100 parts by mass of the synthetic resin.

[Dehydrating Agent]

The synthetic resin composition preferably further contains a dehydrating agent. The dehydrating agent can suppress curing of the synthetic resin composition by moisture contained in air or the like during storage of the synthetic resin composition.

Examples of the dehydrating agent include silane compounds, such as vinyltrimethoxysilane, dimethyldimethoxysilane, tetraethoxysilane, methyltrimethoxysilane, methyltriethoxysilane, tetramethoxysilane, phenyltrimethoxysilane, and diphenyldimethoxysilane; and ester compounds, such as methyl orthoformate, ethyl orthoformate, methyl orthoacetate, and ethyl orthoacetate. These dehydrating agents may be used alone, and two or more kinds thereof may be used in combination. Among these, vinyltrimethoxysilane is preferable.

The content of the dehydrating agent in the synthetic resin composition is preferably 0.5 to 20 parts by mass, and more preferably 1 to 15 parts by mass, relative to 100 parts by mass of the synthetic resin. The dehydrating agent contained in an amount of 0.5 parts by mass or more in the synthetic resin composition can exert sufficient effects thereof. Further, the dehydrating agent contained in an amount of 20 parts by mass or less in the synthetic resin composition allows the synthetic resin composition to have excellent curability.

[Silanol Condensation Catalyst]

The synthetic resin composition preferably contains a silanol condensation catalyst. The silanol condensation catalyst is a catalyst for promoting a dehydration condensation reaction between silanol groups formed by hydrolysis of a hydrolyzable silyl group or the like contained in the synthetic resin.

Examples of the silanol condensation catalyst include organic tin-based compounds, such as 1,1,3,3-tetrabutyl-1,3-dilauryloxycarbonyl-distannoxane, dibutyltin dilaurate, dibutyltin oxide, dibutyltin diacetate, dibutyltin phthalate, bis(dibutyltin laurate) oxide, dibutyltin bis(acetylacetonate), dibutyltin bis(monoester maleate), tin octylate, dibutyltin octoate, dioctyltin oxide, dibutyltin bis(triethoxysilicate), bis(dibutyltin bistriethoxysilicate) oxide, and dibutyltin oxybisethoxysilicate; and organic titanium-based compounds, such as tetra-n-butoxytitanate and tetraisopropoxytitanate. These silanol condensation catalysts may be used alone, and two or more kinds thereof may be used in combination.

As the silanol condensation catalyst, 1,1,3,3-tetrabutyl-1,3-dilauryloxycarbonyl-distannoxane is preferable. Such a silanol condensation catalyst can easily adjust the curing rate of the synthetic resin composition.

The content of the silanol condensation catalyst in the synthetic resin composition is preferably 1 to 10 parts by mass, and more preferably 1 to 5 parts by mass, relative to 100 parts by mass of the synthetic resin. The silanol condensation catalyst contained in an amount of 1 part by mass or more in the synthetic resin composition can increase the curing rate of the synthetic resin composition to shorten the time required for curing the synthetic resin composition. Further, the silanol condensation catalyst contained in an amount of 10 parts by mass or less in the synthetic resin composition allows the synthetic resin composition to have an appropriate curing rate, and improves the storage stability and handling property thereof.

[Other Additives]

The synthetic resin composition may contain other additives such as a thixotropy imparting agent, an antioxidant, an ultraviolet absorber, a pigment, a dye, an antisetting agent, an aminosilane coupling agent, a thixotropic agent, and a solvent. Among these, a thixotropy imparting agent, an ultraviolet absorber, and an antioxidant are preferable.

The thixotropy imparting agent may be any agent capable of imparting thixotropic properties to the synthetic resin composition. Examples of the thixotropy imparting agent include a hydrogenated castor oil, fatty acid bisamide, and fumed silica.

The content of the thixotropy imparting agent in the synthetic resin composition is preferably 0.1 to 200 parts by mass, and more preferably 1 to 150 parts by mass, relative to 100 parts by mass of the synthetic resin. The thixotropy imparting agent contained in an amount of 0.1 parts by mass or more in the synthetic resin composition can effectively impart the thixotropic properties to the synthetic resin composition. Further, the thixotropy imparting agent contained in an amount of 200 parts by mass or less in the synthetic resin composition allows the synthetic resin composition to have an appropriate viscosity and improves the handling property of the synthetic resin composition.

Examples of the ultraviolet absorber include a benzotriazole-based ultraviolet absorber and a benzophenone-based ultraviolet absorber, and a benzotriazole-based ultraviolet absorber is preferable. The content of the ultraviolet absorber in the synthetic resin composition is preferably 0.1 to 20 parts by mass, and more preferably 0.1 to 10 parts by mass, relative to 100 parts by mass of the synthetic resin.

Examples of the antioxidant include a hindered phenol-based antioxidant, a monophenol-based antioxidant, a bisphenol-based antioxidant, and a polyphenol-based antioxidant, and a hindered phenolic antioxidant is preferable. The content of the antioxidant in the synthetic resin composition is preferably 0.1 to 20 parts by mass, and more preferably 0.3 to 10 parts by mass, relative to 100 parts by mass of the synthetic resin.

[Light Stabilizer]

The synthetic resin composition preferably contains a hindered amine-based light stabilizer. The hindered amine-based light stabilizer can provide a synthetic resin composition capable of maintaining excellent rubber elasticity of its cured product for a long period of time.

Examples of the hindered amine-based light stabilizer include a mixture of bis(1,2,2,6,6-pentamethyl-4-piperidyl) cebacate and methyl 1,2,2,6,6-pentamethyl-4-piperidyl cebacate, bis(2,2,6,6-tetramethyl-4-piperidyl)cebacate, a polycondensate of dibutylamine-1,3,5-triazine-N,N'-bis(2,2,6,6-tetramethyl-4-piperidyl-1,6-hexamethylenediamine) with N-(2,2,6,6-tetramethyl-4-piperidyl) butylamine, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], and a polycondensate of dimethyl succinate with 4-hydroxy-2,2,6,6-tetramethyl-1-piperidine ethanol.

The hindered amine-based light stabilizer is preferably an NOR-type hindered amine-based light stabilizer. The NOR-type hindered amine-based light stabilizer can provide the synthetic resin composition capable of suppressing a decrease in rubber elasticity of its cured product over time.

The NOR-type hindered amine-based light stabilizer has an NOR structure in which an alkyl group (R) is bonded via an oxygen atom (O) to a nitrogen atom (N) contained in a piperidine ring skeleton. The number of carbon atoms of the alkyl group in the NOR structure is preferably 1 to 20, more preferably 1 to 18, and particularly preferably 18. Examples of the alkyl group include a linear alkyl group, a branched alkyl group, and a cyclic alkyl group (saturated alicyclic hydrocarbon group).

Examples of the linear alkyl group include a methyl group, an ethyl group, an n-propyl group, an n-butyl group, an n-pentyl group, an n-hexyl group, an n-octyl group, an n-nonyl group, and an n-decyl group. Examples of the branched alkyl group include an isopropyl group, an isobutyl group, a sec-butyl group, and a tert-butyl group. Examples of the cyclic alkyl group (saturated alicyclic hydrocarbon group) include a cyclopentyl group, a cyclohexyl group, and a cyclooctyl group. The hydrogen atom constituting the alkyl group may be substituted with a halogen atom (for example, a fluorine atom, a chlorine atom, a bromine atom, or the like), a hydroxyl group, or the like.

Examples of the NOR-type hindered amine-based light stabilizer include a hindered amine-based light stabilizer represented by the following formula (I).

[Chemical formula 1]

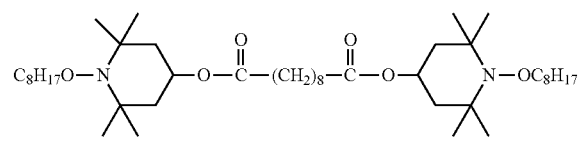

(I)

When the NOR-type hindered amine-based light stabilizer is used, it is preferable to use a combination of an NOR-type hindered amine-based light stabilizer, and a benzotriazole-based ultraviolet absorber or a triazine-based ultraviolet absorber. This can provide a synthetic resin composition in which a decrease in rubber elasticity of its cured product over time is more suppressed.

The content of the hindered amine-based light stabilizer in the synthetic resin composition is preferably 0.01 to 20 parts by mass, and more preferably 0.1 to 10 parts by mass, relative to 100 parts by mass of the synthetic resin.

The above-described synthetic resin composition can be produced by mixing the synthetic resin, the mineral, the binder component, and an additive added as necessary. The synthetic resin composition may be suspended or emulsified in an aqueous solvent to be in the form of a suspension or an emulsion. The synthetic resin composition may be in the form of a dissolution solution dissolved in a solvent. Examples of the water solvent include alcohols such as ethyl alcohol, methyl alcohol, and isopropyl alcohol, and water. Examples of the solvent include xylene, toluene, and acetone.

The synthetic resin composition can be suitably used as a fire-proof material, a sealing material, and an adhesive.

The synthetic resin composition can be used as a sealing material to form a joint structure. As a method for obtaining the joint structure by applying the synthetic resin composition to a joint part, a method including filling the joint part with the synthetic resin composition, and then aging the synthetic resin composition to cure the composition or cooling the synthetic resin composition to solidify the composition is used. The joint structure obtained includes wall members constituting a wall part of a building construction, and the solid body of the synthetic resin composition with which a joint part formed between the wall members adjacent to each other is filled. Examples of the wall part of the building construction include an exterior wall, an interior wall, and a ceiling. Examples of the wall members include exterior wall members, interior wall members, and ceiling members.

The joint part is not particularly limited. Examples of the joint part include joint parts in an exterior wall, an interior wall, and a ceiling of a building construction. The synthetic resin composition can maintain excellent rubber elasticity of its cured product for a long period of time. Therefore, the synthetic resin composition has excellent following property with respect to a change in the width of the joint part that is caused by expansion and contraction of the members due to temperature variation by air temperature or sunshine, or the like, or caused by an action of vibration or a wind pressure. The synthetic resin composition can prevent damage of the members and water leakage into the building construction. Therefore, the synthetic resin composition can be suitably used to seal the joint part at the exterior wall of the building construction, that is, the joint part of which a change in the width is large and which is also referred to as "working joint."

Examples of the joint part in the exterior wall of the building construction include joint parts formed at joining parts between exterior wall members such as a mortar board, a concrete board, a ceramic-based siding board, a metal-based siding board, an ALC board, and a metal board.

The solid body of the synthetic resin composition is burned to produce a rigid combustion residue. The combustion residue can reliably hold a state where the joint part of the building construction is filled therewith and clogged even during a fire, prevent flames from passing through the joint part, and impart excellent fire-proof performance to the wall part of the building construction.

In the synthetic resin composition containing the expansion agent, the solid body of the synthetic resin composition is expanded during combustion, and simultaneously a combustion residue is produced. Therefore, even when the sealing part such as the joint part filled with the synthetic resin composition is expanded, the solid body can smoothly follow expanding of the sealing part to stably maintain a state where the sealing part is filled therewith and clogged. The solid body can impart excellent fire-proof performance to the wall part of the building construction.

Other examples of use of the synthetic resin composition will be described. For example, the synthetic resin composition can be suitably used as an adhesive. With reference to an example in which a tile that is a decorative article is adhesively integrated with a surface of the wall part using the synthetic resin composition, the use will be described.

The synthetic resin composition is melted. Next, the synthetic resin composition in a melted state is applied to a back surface of a tile, and the tile is attached to a predetermined position of a surface of the wall part by intermediary of the synthetic resin composition. Then, the synthetic resin composition is cooled and solidified or cured. Thus, the title is adhesively integrated with the predetermined position of the wall part by the synthetic resin composition. Examples of the wall part of the building construction include an exterior wall, an interior wall, and a ceiling.

The cured product of the synthetic resin composition is burned to produce a rigid combustion residue. The combustion residue rigidly holds a decorative article such as the title adhesively integrated with the surface of the wall part of the building construction even during a fire. The combustion residue prevents the decorative article from detaching from the surface of the wall part during a fire.

Using the synthetic resin composition, a fire-proof material can be formed. When the synthetic resin composition is contained in a molded product formed from an organic material or an inorganic material, the molded product can be used as a fire-proof material. Even when the molded product is burned to form a combustion residue, the combustion residue can be held in a shape, and be prevented from collapsing. The molded product is not particularly limited. Examples thereof include building components such as a wallpaper, a decorative sheet, a substrate (e.g., wall panel and flooring panel), and paper.

Advantageous Effects of Invention

The combustion residue produced by combustion of the synthetic resin composition of the present invention is very rigid. The combustion residue can reliably hold a state where the joint part is filled therewith and clogged even during a fire, and prevent flames from passing through the sealing part such as the joint part, and impart excellent fire-proof performance to the wall part of the building construction, and the like.

The combustion residue produced by combustion of the synthetic resin composition of the present invention is very rigid. Therefore, the combustion residue can rigidly hold a decorative article such as a tile adhesively integrated with a surface of the wall part even during a fire, and can effectively prevent the decorative article from detaching from the wall part.

DESCRIPTION OF EMBODIMENTS

Hereinafter, Examples of the present invention will be more specifically described. The present invention is not limited to Examples.

EXAMPLES

The following raw materials were used in production of synthetic resin compositions of Examples and Comparative Examples.

[Synthetic Resin]

Polyalkylene oxide 1 having a hydrolyzable silyl group (polyalkylene oxide that has a main chain skeleton consisting of polypropylene oxide and has a propyldimethoxysilyl group at the end of the main chain, average number of propyldimethoxysilyl groups per molecule: 2.1, number-average molecular weight: 20,000, trade name "MS polymer S-303," manufactured by Kaneka Corporation)

Polyalkylene oxide 2 having a hydrolyzable silyl group (polyalkylene oxide that has a main chain skeleton consisting of polypropylene oxide and has a methyldimethoxysilyl group at the end of the main chain, average number of propyldimethoxysilyl groups per molecule: 2.1, number-average molecular weight: 15,000, trade name "KANEKA Silyl EST280," manufactured by Kaneka Corporation)

Acrylic resin having a hydrolyzable silyl group (acrylic resin that has a main chain skeleton consisting of a methyl methacrylate-butyl acrylate copolymer and has a trimethoxysilyl group at a portion of the main chain, average number of trimethoxysilyl groups per molecule: 0.3, weight-average molecular weight: 4,000, trade name "US-6150," manufactured by Toagosei Co., Ltd.)

Silicone resin having a hydrolyzable silyl group (silicone resin having a ketoximesilyl group, trade name "Sekisui silicone sealant" manufactured by Sekisui Fuller Company, Ltd.)

Glycidyl-based polymer 1 (two-component type curable resin including a main agent containing an epoxy resin (trade name "Joiner W A agent" manufactured by Sekisui Fuller Company, Ltd., and a curing agent containing polyoxypropylene triamine (trade name "Joiner W B agent" manufactured by Sekisui Fuller Company, Ltd.)

Glycidyl-based polymer 2 (two-component type curable resin including a main agent containing an epoxy resin (trade name "JER828" manufactured by Toagosei Co., Ltd. and an amine-based curing agent containing 2,4,6-tris(dimethylaminomethyl)phenol)

Glycidyl-based polymer 3 (two-component type curable resin including a main agent containing an epoxy resin (trade name "JER828" manufactured by Toagosei Co., Ltd. and a curing agent containing a ketimine compound (trade name "Eponit K-100" manufactured by Nitto Kasei Co., Ltd.))

Isocyanate-based polymer (two-component type curable resin including a main agent containing diphenylmethane diisocyanate (trade name "#558" manufactured by Sekisui Fuller Company, Ltd., and a curing agent containing a castor oil-based polyol (trade name "UX-B" manufactured by Sekisui Fuller Company, Ltd.)

Urethane resin 1 having a hydrolyzable isocyanate group (polyester-based polyurethane resin, trade name "#9611B" manufactured by Sekisui Fuller Company, Ltd.)

Urethane resin 2 having a hydrolyzable isocyanate group (polyether-based urethane resin having an isocyanate group, trade name "#500G" manufactured by Sekisui Fuller Company, Ltd.)

Polyolefin resin (hot melt adhesive, trade name "JM-1733" manufactured by Sekisui Fuller Company, Ltd.)

Emulsion-based polymer (aqueous adhesive mainly containing vinyl acetate as a monomer unit (trade name "S-Dine #5406" manufactured by Sekisui Fuller Company, Ltd., solid content: 45% by mass)

[Mineral]

Feldspar (Mohs hardness: 6, average particle diameter: 5 μm, nepheline syenite, trade name "NESPAR" manufactured by Shiraishi Calcium Kaisha, Ltd.)

Titanium oxide (Mohs hardness: 7, average particle diameter: 0.3 μm, trade name "CR-90" manufactured by Ishihara Sangyo Kaisha, Ltd.)

α-alumina (Mohs hardness: 9, average particle diameter: 0.5 μm, trade name "α-alumina" manufactured by Wako Pure Chemical Industries, Ltd.)

[Binder Component]

Glass frit (phosphoric acid-based glass, "VY0144" manufactured by Nippon Frit Co., Ltd., main component: $P_2O_5$, $Al_2O_3$, and $R_2O$ wherein R is an alkali metal atom, softening point: 404° C.)

Zinc borate (trade name "Fire brake 500" manufactured by Rio Tinto Minerals Asia Pte Ltd)

[Expansion Agent]

Colloidal calcium carbonate (trade name "CCR" manufactured by Shiraishi Kogyo Kaisha, Ltd., average particle diameter: 80 nm, Mohs hardness: 3)

Magnesium silicate hydrate (sepiolite, trade name "MILCON E-2" manufactured by Showa KDE Co., Ltd., average particle diameter: 1 μm, magnesium silicate: 97% by mass, Mohs hardness: 1)

Magnesium aluminum silicate (attapulgite, trade name "Attagel #50" manufactured by Sun Ocean Corporation, average particle diameter: 0.1 μm, magnesium silicate: 97% by mass, Mohs hardness: 1)

Expanded graphite (trade name "TEG" manufactured by Air Water Inc., Mohs hardness: 1)

Aluminum hydroxide (trade name "APYRAL AG" manufactured by NabaiTec AG, Mohs hardness: 3)

Magnesium hydroxide (trade name "MAGSEEDS N-6" manufactured by Konoshima Chemical Co., Ltd., Mohs hardness: 3)

[Other Additives]

Silanol condensation catalyst (1,1,3,3-tetrabutyl-1,3-dilauryloxycarbonyl-distannoxane, trade name "NEOSTANN U-130" manufactured by Nitto Kasei Co., Ltd.)

Dehydrating agent (vinyl trimethoxysilane, trade name "NUC SILICONE A171" manufactured by Nippon Unicar Company Limited)

Aminosilane coupling agent (N-(2-aminoethyl)-3-aminopropyltrimethoxysilane, trade name "KBM-603" manufactured by Shin-Etsu Chemical Co., Ltd.)

Epoxysilane coupling agent (trade name "KBM-403" manufactured by Shin-Etsu Chemical Co., Ltd.)

Benzotriazole-based ultraviolet absorber (trade name "Tinuvin 326" manufactured by BASF Japan Ltd.)

Hindered phenol-based antioxidant (trade name "Irganox 1010" manufactured by BASF Japan Ltd.)

NH-type hindered amine-based light stabilizer (trade name "Tinuvin 770" manufactured by BASF Japan Ltd.)

Thixotropic agent (fatty acid amide wax, trade name "DISPARLON #6500" manufactured by Kusumoto Chemicals, Ltd.)
Aliphatic amine (stearylamine)
Plasticizer (polypropylene glycol, number-average molecular weight: 3,000)
Solvent (isopropyl alcohol)

Examples 1 to 38 and Comparative Examples 1 to 10

A synthetic resin, a mineral, a binder component, an expansion agent, and another additive were uniformly mixed in mixing amounts shown in Tables 1 to 6 using a planetary mixer in a vacuum atmosphere over 60 minutes, to obtain each synthetic resin composition. When the synthetic resin was a two-component curable resin, a main agent, a mineral, a binder component, an expansion agent, and an additive were mixed to serve as a first liquid, and a curing agent was served as a second liquid. A synthetic resin composition was a two-component type synthetic resin composition including the first and second liquids. The first and second liquids of the synthetic resin composition were mixed immediately prior to use, to cure the two-component curable resin. In an emulsion-based polymer, the mass of a solid content is shown.

The strength of a combustion residue of the synthetic resin composition after combustion in an atmosphere of 800° C. for 20 minutes was measured by the aforementioned procedure. The results are shown in Tables 1 to 6.

For the synthetic resin compositions of Examples 1 to 21, 25, and 27, and Comparative Examples 1 to 4, an I-type specimen in accordance with NPO JAPAN EXTERIOR FURNISING TECHNICAL CENTER standard JTC 5-0001 was aged at 23° C. and a relative humidity of 50% for 28 days. After that, the 50% modulus and the elongation ratio were measured by the aforementioned procedure. The results are shown in Tables 1, 2, 4 and 6.

For the synthetic resin compositions of Examples 1 to 26 and Comparative Examples 1 to 4, the joint-following property of each combustion residue after combustion in an atmosphere of 800° C. for 20 minutes was measured by the following procedure. The results are shown in Tables 1 to 4 and 6.

The shear strength of the synthetic resin compositions of Examples 22 to 24, 27 to 38, and Comparative Examples 5 to 10 was measured by the aforementioned procedure. The results are shown in Tables 3, 5, and 6.

For the synthetic resin compositions of Examples 22 to 24, 27 to 38, and Comparative Examples 5 to 10, the tile-holding property was measured by the following procedure. The results are shown in Tables 3, 5, and 6.

(Joint-following Property of Combustion Residue)

Two plates of external wall material (trade name "ALC" manufactured by Asahi Kasei Corporation) were prepared, and disposed so that the distance between facing surfaces of the two plates was 10 mm. A gap between the plates of the external wall material was formed as a sealing part. The sealing part was filled with the synthetic resin composition, and the synthetic resin composition was aged at 23° C. and a relative humidity of 50% for 28 days, to form a specimen. The specimen was burned in an atmosphere of 800° C. for 20 minutes. The length of the gap between the external wall material and a combustion residue of the synthetic resin composition was measured using a thickness gauge. The length of the gap was evaluated in accordance with the following criteria.
A (less than 0.5 mm)
B (0.5 mm or more and less than 1.0 mm)
C (1.0 mm or more)

(Tile-Holding Property)

Four tiles having a square planar shape with a side of 15 cm and a flat surface were prepared. The synthetic resin composition was melted, and then applied to a whole back surface of each of the tiles at a coating amount of 100 g/m$^2$.

Subsequently, a mortar external wall material was prepared. On a surface of the external wall material, the four tiles were placed with the synthetic resin composition disposed on a side of the external wall material. The synthetic resin composition was then cooled and solidified or cured. Thus, the tiles were adhesively integrated with the surface of the external wall material, to produce a specimen. The distance between the adjacent tiles was 0.5 cm.

When the synthetic resin composition was cooled and solidified, the synthetic resin composition was left in an environment of 23° C. for 60. When the synthetic resin composition was cured, the synthetic resin composition was aged in an environment of 23° C. and a relative humidity of 50% for 1 month.

The specimen was left in a constant temperature bath of 600° C. for 30 minutes, burned, taken from the constant temperature bath, and then left in an atmosphere of 23° C. for 3 hours. The external wall material was made stand vertically, and the detachment or attachment of the four tiles was observed.
A (four tiles were not detached, and were very strongly bonded)
B (four tiles were not detached, but were very easily detached when they were touched by a hand)
C (one to three tiles were detached)
D (all four tiles were detached)

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Synthetic resin composition | Synthetic resin (part by mass) | Polyalkylene oxide 1 having hydrolyzable silyl group | 100 | 100 | 100 | 100 | 100 | 100 | 100 | 100 | 100 | 100 |
| | Minerals (part by mass) | Feldspar (Mohs hardness: 6) | 160 | 160 | 100 | 160 | 160 | 160 | 160 | 160 | 160 | 160 |
| | | Titanium oxide (Mohs hardness: 7) | 0 | 0 | 0 | 0 | 0 | 0 | 0 | 0 | 0 | 0 |
| | | α-alumina (Mohs hardness: 9) | 0 | 0 | 0 | 0 | 0 | 0 | 0 | 0 | 0 | 0 |
| | Binder component (part by mass) | Glass frit | 40 | 40 | 40 | 40 | 20 | 40 | 40 | 40 | 40 | 0 |
| | | Zinc borate | 0 | 0 | 0 | 0 | 0 | 0 | 0 | 0 | 0 | 40 |

TABLE 1-continued

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| | Expansion agent (part by mass) | Colloidal calcium carbonate | 0 | 0 | 0 | 0 | 0 | 4 | 0 | 0 | 0 | 0 |
| | | Magnesium silicate hydrate (sepiolite) | 4 | 0 | 4 | 2 | 4 | 0 | 0 | 0 | 0 | 4 |
| | | Magnesium aluminum silicate (attapulgite) | 0 | 4 | 0 | 0 | 0 | 0 | 0 | 0 | 0 | 0 |
| | | Expanded graphite | 0 | 0 | 0 | 0 | 0 | 0 | 4 | 0 | 0 | 0 |
| | | Aluminum hydroxide | 0 | 0 | 0 | 0 | 0 | 0 | 0 | 4 | 0 | 0 |
| | | Magnesium hydroxide | 0 | 0 | 0 | 0 | 0 | 0 | 0 | 0 | 4 | 0 |
| | Additive (part by mass) | Silanol condensation catalyst | 2 | 2 | 2 | 2 | 2 | 2 | 2 | 2 | 2 | 2 |
| | | Dehydrating agent | 3 | 3 | 3 | 3 | 3 | 3 | 3 | 3 | 3 | 3 |
| | | Aminosilane coupling agent | 3 | 3 | 3 | 3 | 3 | 3 | 3 | 3 | 3 | 3 |
| | | Benzotriazole-based ultraviolet absorber | 1 | 1 | 1 | 1 | 1 | 1 | 1 | 1 | 1 | 1 |
| | | Hindered phenolic antioxidant | 1 | 1 | 1 | 1 | 1 | 1 | 1 | 1 | 1 | 1 |
| | | NH-type hindered amine-based light stabilizer | 1 | 1 | 1 | 1 | 1 | 1 | 1 | 1 | 1 | 1 |
| | | Thixotropic agent | 3 | 3 | 3 | 3 | 3 | 3 | 3 | 3 | 3 | 3 |
| | | Aliphatic amine | 2 | 2 | 2 | 2 | 2 | 2 | 2 | 2 | 2 | 2 |
| | Proportion | Minerals/Binder component | 4.0 | 4.0 | 2.5 | 4.0 | 8.0 | 4.0 | 4.0 | 4.0 | 4.0 | 4.0 |
| | | Minerals/Expansion agent | 40 | 40 | 25 | 80 | 40 | 40 | 40 | 40 | 40 | 40 |
| Evaluation | Strength of combustion residue (N/mm$^2$) | | 13.9 | 12.5 | 7.9 | 4.3 | 8.0 | 4.0 | 3.1 | 4.2 | 4.0 | 10.2 |
| | Joint-following property of combustion residue | | A | A | A | B | A | A | A | A | A | A |
| | 50% modulus (N/mm$^2$) | | 0.12 | 0.12 | 0.08 | 0.1 | 0.12 | 0.12 | 0.18 | 0.16 | 0.16 | 0.14 |
| | Elongation ratio (%) | | 330 | 330 | 400 | 460 | 360 | 380 | 420 | 420 | 420 | 360 |

TABLE 2

| | | | Example | | | | | | |
|---|---|---|---|---|---|---|---|---|---|
| | | | 11 | 12 | 13 | 14 | 15 | 16 | 17 |
| Synthetic resin composition | Synthetic resin (part by mass) | Polyalkylene oxide 1 having hydrolyzable silyl group | 100 | 100 | 100 | 100 | 100 | 100 | 100 |
| | Minerals (part by mass) | Feldspar (Mohs hardness: 6) | 20 | 300 | 160 | 160 | 160 | 160 | 160 |
| | | Titanium oxide (Mohs hardness: 7) | 0 | 0 | 0 | 0 | 0 | 0 | 0 |
| | | α-alumina (Mohs hardness: 9) | 0 | 0 | 0 | 0 | 0 | 0 | 0 |
| | Binder component (part by mass) | Glass frit | 40 | 40 | 0 | 40 | 0 | 10 | 80 |
| | | Zinc borate | 0 | 0 | 0 | 0 | 0 | 0 | 0 |
| | Expansion agent (part by mass) | Colloidal calcium carbonate | 0 | 0 | 0 | 0 | 0 | 0 | 0 |
| | | Magnesium silicate hydrate (sepiolite) | 4 | 4 | 0 | 0 | 4 | 4 | 4 |
| | | Magnesium aluminum silicate (attapulgite) | 0 | 0 | 0 | 0 | 0 | 0 | 0 |
| | | Expanded graphite | 0 | 0 | 0 | 0 | 0 | 0 | 0 |
| | | Aluminum hydroxide | 0 | 0 | 0 | 0 | 0 | 0 | 0 |
| | | Magnesium hydroxide | 0 | 0 | 0 | 0 | 0 | 0 | 0 |
| | Additive (part by mass) | Silanol condensation catalyst | 2 | 2 | 2 | 2 | 2 | 2 | 2 |
| | | Dehydrating agent | 3 | 3 | 3 | 3 | 3 | 3 | 3 |
| | | Aminosilane coupling agent | 3 | 3 | 3 | 3 | 3 | 3 | 3 |
| | | Benzotriazole-based ultraviolet absorber | 1 | 1 | 1 | 1 | 1 | 1 | 1 |
| | | Hindered phenolic antioxidant | 1 | 1 | 1 | 1 | 1 | 1 | 1 |
| | | NH-type hindered amine-based light stabilizer | 1 | 1 | 1 | 1 | 1 | 1 | 1 |
| | | Thixotropic agent | 3 | 3 | 3 | 3 | 3 | 3 | 3 |
| | | Aliphatic amine | 2 | 2 | 2 | 2 | 2 | 2 | 2 |
| | Proportion | Minerals/Binder component | 0.5 | 7.5 | — | 4.0 | — | 16.0 | 2.0 |
| | | Minerals/Expansion agent | 5 | 75 | — | — | 40 | 40 | 40 |
| Evaluation | Strength of combustion residue (N/mm$^2$) | | 1.7 | 8.8 | 4.2 | 12.4 | 2.9 | 3.9 | 10.7 |
| | Joint-following property of combustion residue | | A | B | C | C | A | A | A |
| | 50% modulus (N/mm$^2$) | | 0.08 | 0.25 | 0.10 | 0.12 | 0.14 | 0.14 | 0.16 |
| | Elongation ratio (%) | | 380 | 300 | 500 | 440 | 350 | 350 | 300 |

TABLE 2-continued

|  |  |  | Example | | | | Comparative Example | | |
|---|---|---|---|---|---|---|---|---|---|
|  |  |  | 18 | 19 | 20 | 21 | 1 | 2 | 3 |
| Synthetic resin composition | Synthetic resin (part by mass) | Polyalkylene oxide 1 having hydrolyzable silyl group | 100 | 100 | 100 | 100 | 100 | 100 | 100 |
|  | Minerals (part by mass) | Feldspar (Mohs hardness: 6) | 160 | 160 | 0 | 0 | 0 | 0 | 0 |
|  |  | Titanium oxide (Mohs hardness: 7) | 0 | 0 | 20 | 0 | 0 | 0 | 0 |
|  |  | α-alumina (Mohs hardness: 9) | 0 | 0 | 0 | 20 | 0 | 0 | 0 |
|  | Binder component (part by mass) | Glass frit | 40 | 40 | 40 | 40 | 40 | 40 | 40 |
|  |  | Zinc borate | 0 | 0 | 0 | 0 | 0 | 0 | 0 |
|  | Expansion agent (part by mass) | Colloidal calcium carbonate | 0 | 0 | 0 | 0 | 0 | 4 | 160 |
|  |  | Magnesium silicate hydrate (sepiolite) | 1 | 10 | 4 | 4 | 4 | 0 | 4 |
|  |  | Magnesium aluminum silicate (attapulgite) | 0 | 0 | 0 | 0 | 0 | 0 | 0 |
|  |  | Expanded graphite | 0 | 0 | 0 | 0 | 0 | 0 | 0 |
|  |  | Aluminum hydroxide | 0 | 0 | 0 | 0 | 0 | 0 | 0 |
|  |  | Magnesium hydroxide | 0 | 0 | 0 | 0 | 0 | 0 | 0 |
|  | Additive (part by mass) | Silanol condensation catalyst | 2 | 2 | 2 | 2 | 2 | 2 | 2 |
|  |  | Dehydrating agent | 3 | 3 | 3 | 3 | 3 | 3 | 3 |
|  |  | Aminosilane coupling agent | 3 | 3 | 3 | 3 | 3 | 3 | 3 |
|  |  | Benzotriazole-based ultraviolet absorber | 1 | 1 | 1 | 1 | 1 | 1 | 1 |
|  |  | Hindered phenolic antioxidant | 1 | 1 | 1 | 1 | 1 | 1 | 1 |
|  |  | NH-type hindered amine-based light stabilizer | 1 | 1 | 1 | 1 | 1 | 1 | 1 |
|  |  | Thixotropic agent | 3 | 3 | 3 | 3 | 3 | 3 | 3 |
|  |  | Aliphatic amine | 2 | 2 | 2 | 2 | 2 | 2 | 2 |
|  | Proportion | Minerals/Binder component | 4.0 | 4.0 | 0.5 | 0.5 | 0 | 0 | 0 |
|  |  | Minerals/Expansion agent | 160 | 16 | 5 | 5 | 0 | 0 | 0 |
| Evaluation |  | Strength of combustion residue (N/mm$^2$) | 14.9 | 2.1 | 1.1 | 1.3 | 0.4 | 0.2 | 0.1 |
|  |  | Joint-following property of combustion residue | C | B | A | A | A | A | A |
|  |  | 50% modulus (N/mm$^2$) | 0.12 | 0.18 | 0.08 | 0.08 | 0.10 | 0.12 | 0.20 |
|  |  | Elongation ratio (%) | 500 | 260 | 330 | 350 | 360 | 500 | 480 |

TABLE 3

|  |  |  | | Example | | |
|---|---|---|---|---|---|---|
|  |  |  | | 22 | 23 | 24 |
| Synthetic resin composition | Synthetic resin (part by mass) | Polyalkylene oxide 2 having hydrolyzable silyl group | | 70 | 70 | 70 |
|  |  | Acrylic resin having hydrolyzable silyl group | | 30 | 30 | 30 |
|  |  | Glycidyl-based polymer 2 | Main agent (epoxy resin) | 30 | 0 | 0 |
|  |  |  | Curing agent | 3 | 0 | 0 |
|  |  | Glycidyl-based polymer 3 | Main agent (epoxy resin) | 0 | 30 | 10 |
|  |  |  | Curing agent | 0 | 10 | 3 |
|  | Minerals (part by mass) | Feldspar (Mohs hardness: 6) | | 100 | 100 | 140 |
|  | Binder component (part by mass) | Glass frit | | 25 | 25 | 35 |
|  | Expansion agent (part by mass) | Colloidal calcium carbonate | | 50 | 50 | 100 |
|  | Additive (part by mass) | Silanol condensation catalyst | | 1 | 1 | 1 |
|  |  | Dehydrating agent | | 4 | 4 | 4 |
|  |  | Aminosilane coupling agent | | 2 | 0 | 0 |
|  |  | Epoxysilane coupling agent | | 0 | 2 | 2 |
|  |  | Benzotriazole-based ultraviolet absorber | | 1 | 1 | 1 |
|  |  | Hindered phenolic antioxidant | | 1 | 1 | 1 |
|  |  | NH-type hindered amine-based light stabilizer | | 1 | 1 | 1 |
|  |  | Plasticizer | | 0 | 0 | 30 |
|  |  | Isopropyl alcohol | | 3 | 0 | 0 |

TABLE 3-continued

|  |  |  | Example | | |
|---|---|---|---|---|---|
|  |  |  | 22 | 23 | 24 |
|  | Proportion | Minerals/Binder component | 4.0 | 4.0 | 4.0 |
|  |  | Minerals/Expansion agent | 2 | 2 | 1.4 |
| Evaluation | Strength of combustion residue (N/mm²) | | 13.3 | 13.0 | 12.1 |
|  | Joint-following property of combustion residue | | A | A | A |
|  | Shear strength (N/mm²) | | 1.4 | 1.3 | 0.9 |
|  | Tile-holding property | | A | A | A |

TABLE 4

|  |  |  | Example | |
|---|---|---|---|---|
|  |  |  | 25 | 26 |
| Synthetic resin composition | Synthetic resin (part by mass) | Silicone resin having hydrolyzable silyl group | 100 | 100 |
|  |  | Glycidyl-based polymer 1 — Main agent (epoxy resin) | 0 | 0 |
|  |  | Curing agent | 0 | 0 |
|  |  | Isocyanate-based polymer — Main agent | 0 | 0 |
|  |  | Curing agent | 0 | 0 |
|  |  | Urethane resin 1 having hydrolyzable isocyanate group | 0 | 0 |
|  |  | Urethane resin 2 having hydrolyzable isocyanate group | 0 | 0 |
|  |  | Polyolefin based resin | 0 | 0 |
|  |  | Emulsion-based polymer | 0 | 0 |
|  | Minerals (part by mass) | Feldspar (Mohs hardness: 6) | 160 | 160 |
|  | Binder component (part by mass) | Glass frit | 40 | 0 |
|  | Proportion | Minerals/Binder component | 4.0 | — |
| Evaluation | Strength of combustion residue (N/mm²) | | 12.0 | 8.2 |
|  | Joint-following property of combustion residue | | A | A |
|  | 50% modulus (N/mm²) | | 0.2 | 0.18 |
|  | Elongation ratio (%) | | 310 | 300 |

TABLE 5

|  |  |  | Example | | | | | | | | | | | |
|---|---|---|---|---|---|---|---|---|---|---|---|---|---|---|
|  |  |  | 27 | 28 | 29 | 30 | 31 | 32 | 33 | 34 | 35 | 36 | 37 | 38 |
| Synthetic resin composition | Synthetic resin (part by mass) | Silicone resin having hydrolyzable silyl group | 0 | 0 | 0 | 0 | 0 | 0 | 0 | 0 | 0 | 0 | 0 | 0 |
|  |  | Glycidyl-based polymer 1 — Main agent (epoxy resin) | 50 | 50 | 0 | 0 | 0 | 0 | 0 | 0 | 0 | 0 | 0 | 0 |
|  |  | Curing agent | 50 | 50 | 0 | 0 | 0 | 0 | 0 | 0 | 0 | 0 | 0 | 0 |
|  |  | Isocyanate-based polymer — Main agent | 0 | 0 | 80 | 80 | 0 | 0 | 0 | 0 | 0 | 0 | 0 | 0 |
|  |  | Curing agent | 0 | 0 | 20 | 20 | 0 | 0 | 0 | 0 | 0 | 0 | 0 | 0 |
|  |  | Urethane resin 1 having hydrolyzable isocyanate group | 0 | 0 | 0 | 0 | 100 | 100 | 0 | 0 | 0 | 0 | 0 | 0 |
|  |  | Urethane resin 2 having hydrolyzable isocyanate group | 0 | 0 | 0 | 0 | 0 | 0 | 100 | 100 | 0 | 0 | 0 | 0 |
|  |  | Polyolefin based resin | 0 | 0 | 0 | 0 | 0 | 0 | 0 | 0 | 100 | 100 | 0 | 0 |
|  |  | Emulsion-based polymer | 0 | 0 | 0 | 0 | 0 | 0 | 0 | 0 | 0 | 0 | 100 | 100 |
|  | Minerals (part by mass) | Feldspar (Mohs hardness: 6) | 160 | 160 | 160 | 160 | 160 | 160 | 160 | 160 | 160 | 160 | 160 | 160 |
|  | Binder component (part by mass) | Glass frit | 40 | 0 | 40 | 0 | 40 | 0 | 40 | 0 | 40 | 0 | 40 | 0 |
|  | Proportion | Minerals/Binder component | 4.0 | — | 4.0 | — | 4.0 | — | 4.0 | — | 4.0 | — | 4.0 | — |
| Evaluation | Strength of combustion residue (N/mm²) | | 13.1 | 9.1 | 12.7 | 8.9 | 11.7 | 7.8 | 12.0 | 8.1 | 8.2 | 5.6 | 8.2 | 5.6 |
|  | Shear strength (N/mm²) | | 20 | 19 | 15 | 13 | 9 | 7 | 2 | 1.7 | 3 | 2.5 | 3 | 2.5 |
|  | Tile-holding property | | A | B | A | B | A | B | A | B | A | B | A | B |

TABLE 6

|  |  |  | Comparative Example | | | | | | |
|---|---|---|---|---|---|---|---|---|---|
|  |  |  | 4 | 5 | 6 | 7 | 8 | 9 | 10 |
| Synthetic resin composition | Synthetic resin (part by mass) | Silicone resin having hydrolyzable silyl group | 100 | 0 | 0 | 0 | 0 | 0 | 0 |
|  |  | Glycidyl-based polymer 1 — Main agent (epoxy resin) | 0 | 50 | 0 | 0 | 0 | 0 | 0 |
|  |  | Glycidyl-based polymer 1 — Curing agent | 0 | 50 | 0 | 0 | 0 | 0 | 0 |
|  |  | Isocyanate-based polymer — Main agent | 0 | 0 | 80 | 0 | 0 | 0 | 0 |
|  |  | Isocyanate-based polymer — Curing agent | 0 | 0 | 20 | 0 | 0 | 0 | 0 |
|  |  | Urethane resin 1 having hydrolyzable isocyanate group | 0 | 0 | 0 | 100 | 0 | 0 | 0 |
|  |  | Urethane resin 2 having hydrolyzable isocyanate group | 0 | 0 | 0 | 0 | 100 | 0 | 0 |
|  |  | Polyolefin based resin | 0 | 0 | 0 | 0 | 0 | 100 | 0 |
|  |  | Emulsion-based polymer | 0 | 0 | 0 | 0 | 0 | 0 | 100 |
|  | Minerals (part by mass) | Feldspar (Mohs hardness: 6) | 0 | 0 | 0 | 0 | 0 | 0 | 0 |
|  | Binder component (part by mass) | Glass frit | 0 | 0 | 0 | 0 | 0 | 0 | 0 |
|  | Expansion agent (part by mass) | Colloidal calcium carbonate | 160 | 160 | 160 | 160 | 160 | 160 | 160 |
| Evaluation |  | Strength of combustion residue (N/mm$^2$) | 0.2 | 0.1 | 0.1 | 0.1 | 0.1 | 0.1 | 0.1 |
|  |  | Joint-following property of combustion residue | C | — | — | — | — | — | — |
|  |  | 50% modulus (N/mm$^2$) | 0.2 | — | — | — | — | — | — |
|  |  | Elongation ratio (%) | 300 | — | — | — | — | — | — |
|  |  | Shear strength (N/mm$^2$) | — | 1.5 | 1 | 19 | 13 | 7 | 2.5 |
|  |  | Tile-holding property | — | D | D | D | D | D | D |

INDUSTRIAL APPLICABILITY

A combustion residue produced by combustion of the synthetic resin composition of the present invention is very rigid. The synthetic resin composition can be suitably used as a sealing material. The combustion residue can reliably hold a state where a joint part is filled therewith and clogged even during a fire, prevent flames from passing through a sealing part such as the joint part, and impart excellent fire-proof performance to a wall part of a building construction, and the like.

The synthetic resin composition can also be suitably used as an adhesive. For example, the combustion residue can rigidly hold a decorative article such as a tile adhesively integrated with a surface of the wall part even during a fire, and can effectively prevent the decorative article from detaching from the wall part.

CROSS-REFERENCE TO RELATED APPLICATION

The present application claims the priorities under Japanese Patent Application No. 2018-089675 filed on May 8, 2018 and Japanese Patent Application No. 2018-089677 filed on May 8, 2018, the disclosures of which are hereby incorporated in their entirety by reference.

The invention claimed is:

1. A synthetic resin composition comprising a synthetic resin, a mineral having a Mohs hardness of 5 or more, and a binder component, a strength of a combustion residue of the synthetic resin composition after combustion in an atmosphere of 800° C. for 20 minutes being 2.0 N/mm$^2$ or more,
   wherein the binder component contains at least one compound selected from the group consisting of glass frit and a boric acid compound, and
   wherein a content of the mineral in the synthetic resin composition is 50 parts by mass or more relative to 100 parts by mass of the synthetic resin.

2. The synthetic resin composition according to claim 1, wherein the synthetic resin is a curable resin.

3. The synthetic resin composition according to claim 2, wherein the curable resin is a polymer having a hydrolyzable silyl group.

4. The synthetic resin composition according to claim 1, wherein the mineral having a Mohs hardness of 5 or more is feldspars.

5. The synthetic resin composition according to claim 4, wherein the feldspars contains nepheline syenite.

6. The synthetic resin composition according to claim 1, comprising an expansion agent.

7. The synthetic resin composition according to claim 6, wherein the expansion agent contains calcium carbonate and/or magnesium silicate.

8. The synthetic resin composition according to claim 1, wherein a 50% modulus and an elongation ratio after aging an I-type specimen in accordance with NPO JAPAN EXTERIOR FURNISING TECHNICAL CENTER standard JTC S-0001 at 23° C. and a relative humidity of 50% for 28 days are 0.05 to 0.40 N/mm$^2$ and 400% or more, respectively.

9. A fire-proof material comprising the synthetic resin composition according to claim 1.

10. A sealing material comprising the synthetic resin composition according to claim 1.

11. An adhesive comprising the synthetic resin composition according to claim 1.

12. The adhesive according to claim 11, having a shear strength of 1.0 N/mm$^2$ or more.

13. A joint structure comprising:
   wall members constituting a wall part of a building construction; and the sealing material according to claim 10 or a cured product thereof with which a joint part formed between the wall members is filled.

\* \* \* \* \*